United States Patent [19]

Kitamoto et al.

[11] 4,410,565
[45] Oct. 18, 1983

[54] METHODS OF MAKING A MAGNETIC RECORDING MEDIUM

[75] Inventors: Tatsuji Kitamoto; Ryuji Shirahata; Yasuo Tamai, all of Odawara, Japan

[73] Assignee: Fuji Photo Film Co., Ltd., Minami-ashigara, Japan

[21] Appl. No.: 352,224

[22] Filed: Feb. 25, 1982

[30] Foreign Application Priority Data

Feb. 27, 1981 [JP] Japan .................................. 56-28194

[51] Int. Cl.³ .............................................. H01F 10/02
[52] U.S. Cl. ................................... 427/130; 427/131; 427/250; 427/365; 427/366
[58] Field of Search ............... 427/130, 131, 250, 365, 427/366

[56] References Cited

U.S. PATENT DOCUMENTS

| | | | |
|---|---|---|---|
| 2,671,034 | 3/1954 | Steinfeld | 117/71 |
| 3,329,601 | 7/1967 | Mattox | 204/298 |
| 3,342,632 | 9/1967 | Bate et al. | 117/217 |
| 3,342,633 | 9/1967 | Bate et al. | 117/217 |
| 3,516,860 | 6/1970 | Simmons | 117/236 |
| 3,615,911 | 10/1971 | Nesbitt et al. | 148/31.57 |
| 3,625,849 | 12/1971 | Rogalla | 204/192 |
| 3,700,500 | 10/1972 | Rodbell et al. | 117/239 |
| 3,772,174 | 11/1973 | Spalvins | 204/192 |
| 3,772,179 | 11/1973 | Beer | 204/197 |
| 3,787,237 | 1/1974 | Grunberg et al. | 117/239 |
| 3,856,579 | 12/1974 | Allen et al. | 148/103 |

OTHER PUBLICATIONS

"Vacuum Deposition of Thin Film", L. Holland, Chapman and Hall Ltd., 1956.
"Handbook of Thin Film Technology", L. I. Maissel and R. Glang, McGraw-Hill Co., 1970.
"Coating Kogaku", i Asakura Shoten, "Coating Engineering", pp. 253–277, Mar. 20, 1971.

Primary Examiner—Bernard D. Pianalto
Attorney, Agent, or Firm—Fleit, Jacobson, Cohn & Price

[57] ABSTRACT

A magnetic recording medium comprising a substrate, a thermoplastic prime coat provided thereon, and a ferromagnetic metal layer having columnar grains which at least partially penetrate into the prime coat from the top thereof and are integrated therewith. The medium is prepared by applying a prime coat onto a substrate, forming a magnetic metal layer having columnar grains by vapor deposition, and then heating and pressing the obtained combination.

13 Claims, 1 Drawing Figure

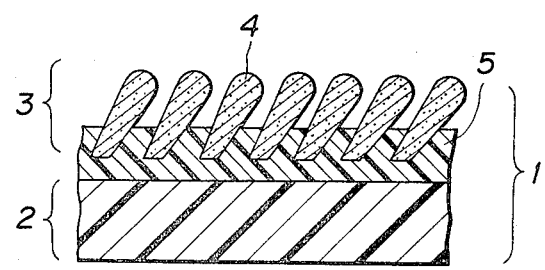

METHOD OF MAKING A MAGNETIC RECORDING MEDIUM

BACKGROUND OF THE INVENTION

1. Field of the Invention

This invention relates to an improvement in a magnetic recording medium having a magnetic thin film recording layer formed by the vapor deposition process, and more particularly to a vapor deposition type magnetic recording medium showing improved durability, and a method of preparation thereof.

2. Description of the Prior Art

Coating type magnetic recording media are widely used. These magnetic recording media used powdered magnetic materials such as magnetic oxide particles and ferromagnetic alloy particles, for example, $\gamma$-$Fe_2O_3$, Co-modified $\gamma$-$Fe_2O_3$, $Fe_3O_4$, Co-modified $Fe_3O_4$, Berthollide compounds; intermediate compound between $\gamma$-$Fe_2O_3$ and $Fe_3O_4$, $CrO_2$ or the like. These powdered magnetic materials are dispersed in organic binders such as vinyl chloride-vinyl acetate copolymers, styrene-butadiene copolymers, epoxy resins and polyurethane resins. The dispersions thus obtained are then applied in coats on non-magnetic substrates and dried to form the magnetic recording media. Recently, because of their ability to meet strong demand for high density recording, so-called thin metal film type magnetic recording media using no binders have attracted attention. The magnetic recording media of this type have magnetic recording layers which consist of ferromagnetic metal thin films formed by a vapor deposition process such as vacuum deposition, sputtering and ion plating, or a plating process such as electroplating and electroless plating. Thus various efforts are being made to develop thin metal film type magnetic recording media suitable for practical use.

In the conventional coating type magnetic recording media, metal oxides showing low saturation magnetization are mainly used as the magnetic material. If the thickness of the magnetic layer on substrate is reduced, the signal output level also drops because of low saturation magnetization. Therefore, it is impossible to reduce the thickness of the magnetic layer to such as extent as required for the high density recording. In addition, the coating type magnetic recording media are also disadvantageous in that they require complicated production processes and bulky equipment for the recovery of solvents or for pollution control. On the other hand, the thin metal film type magnetic recording media can be provided with extremely thin magnetic films. In this type of magnetic recording media, ferromagnetic metals showing higher saturation magnetization than metal oxides can be formed as thin films on substrates without using non-magnetic materials such as binders. Among the thin metal film type magnetic recording media, a vapor deposition type magnetic recording medium having a magnetic film formed from a magnetic material in vapor phase is advantageous because the magnetic film can be formed at a high speed, because the production process is simple and because the no treatment steps for the disposal of waste liquor are necessary.

However, the vapor deposition type magnetic recording medium involves certain problems, one of which is that concerning the impact and friction strength. That is, the recording layer of the medium is sometimes broken by contact with a magnetic head or a guide roll when moved relative to the magnetic head or the guide roll during the recording, reproducing and erasing process.

To solve the above described problem of the vapor deposition type magnetic recording medium, an attempt has been made to apply an overcoat, which has a thickness of about 0.2$\mu$ and is made of a high-molecular weight material in a film form, onto the recording layer. However, this method is not desirable because the output level of the magnetic signal decreases in the case of high density recording due to the space loss which is caused by the thickness of the overcoat. If the thickness of the overcoat is reduced to minimize the space loss, the magnetic recording medium becomes less durable and cannot satisfactorily be used in practical applications. Further, the effect of the overcoat to provide durability deteriorates when the magnetic recording medium is used over long periods of time.

It has also been proposed to provide a prime-coating layer between a substrate and a magnetic thin film so as to improve the adhesion therebetween, thereby to improve the durability of the magnetic recording medium and prevent problems such as peeling of the magnetic layer during use. This method relies only on the adhesion between the upper surface of the prime-coating layer and the bottom surface of the magnetic layer. Use of only the prime-coating layer cannot, however, give a sufficient peel strength to the recording layer. Thus the magnetic recording medium obtained by this conventional method does not exhibit sufficient durability.

SUMMARY OF THE INVENTION

The object of the present invention is to provide a vapor deposition type magnetic recording medium which shows excellent durability and can eliminate the disadvantages of the conventional magnetic recording media as described above.

Another object of the present invention is to provide a vapor deposition type magnetic recording medium which can retain the effect of the improvement in durability for long periods of time.

A further object of the present invention is to provide a vapor deposition type magnetic recording medium which is extremely thin and yet shows excellent durability.

A still further object of the present invention is to provide a vapor deposition type magnetic recording medium which is extremely durable and yet exhibits the magnetic characteristics desirable of a high density magnetic recording medium.

An even further object of the present invention is to provide a method of preparing an extremely durable vapor deposition type magnetic recording medium in a simple manner.

The inventors conducted a study to find way of improving the thin metal film magnetic recording medium and found that the adhesion and the durability of the vapor deposition type magnetic film can be improved remarkably if a prime-coating layer of a thermoplastic resin is first applied onto a substrate, a magnetic metal thin film having columnar grain structures is formed on the prime-coating layer, and then the obtained combination is heated and pressed so as to cause the thermoplastic prime-coating layer to penetrate into the gaps between the columnar grain structures. It was also found that the effect of the improved adhesion and durability could be retained for long periods of time.

Accordingly, the present invention provides a magnetic recording medium comprising a substrate, a thermoplastic prime-coating layer provided thereon, and a ferromagnetic metal layer having grain structures which have grown in a columnar form and which are caused to penetrate at least partially into the prime-coating layer from the top thereof and be integrated therewith.

The present invention also provides a method of preparing a magnetic recording medium which comprises applying a prime-coating layer of a thermoplastic resin onto a substrate film, forming a magnetic metal thin film with columnar grain structures on the prime-coating layer by means of vapor deposition, and thereafter heating and pressing the resulting combination, whereby the thermoplastic prime-coating layer is caused to penetrate into the gaps between the columnar grain structures and be bound with the columnar grain structures.

BRIEF DESCRIPTION OF THE FIGURE

The FIGURE is a schematic view showing an embodiment of the magnetic recording medium according to the present invention.

DESCRIPTION OF THE PREFERRED EMBODIMENTS

Now the present invention will be described in detail with reference to the drawing.

Referring to the FIGURE showing an embodiment of the magnetic recording medium according to the present invention, a magnetic recording medium 1 consists of a nonmagnetic substrate 2, a thermoplastic resin layer 5 and a magnetic metal thin film layer 3 formed thereon by the vapor deposition process. The magnetic metal thin film layer 3 comprises columnar grain structures 4, and the thermoplastic resin 5 is present in the gaps between the columnar grain structures 4, and in the space thereunder.

The term "vapor deposition process" as used herein means a process in which a material or a compound thereof to be deposited is converted into vapor or ionized vapor and deposited onto a supporting layer in a gas or a vacuum. It broadly embraces the vacuum deposition, sputtering, ion plating and chemical vapor deposition processes and the like.

The conditions under which the vapor deposition process is carried out differ largely according to the method and the material used. The main treatment conditions for the different methods are as listed in Table 1 below.

TABLE 1

| | Process | | | | |
|---|---|---|---|---|---|
| Conditions | Vacuum deposition | Sputtering | Ion plating | Ion beam deposition | Chemical vapor deposition |
| Pressure of atmosphere in square brackets (Torr) | $\lesssim 10^{-5}$ | $10^{-2} \sim 10^{-3}$ [Ar] | $10^{-2} \sim 10^{-3}$ [Ar] | $10^{-5} \sim 10^{-6}$ | <1 atm [Ar] |
| Temperature of material | Evaporation temperature | Water cooling | Evaporation temperature | — | >Evaporation temperature |
| Film thickness | ~Several microns | ~Several tens of microns | ~Several tens of microns | ~Several microns | ~Several hundreds of microns |
| Deposition rate (Å/sec) | ~Several hundreds | ~Several hundreds | ~Several hundreds | Several tens ~3000 | $10^2$ |
| Voltage applied | — | Several volts~ several hundreds of volts | Several tens of volts~ 10kV (glow discharge) | ~500V | — |

The ferromagnetic metal layer to be used as the magnetic recording layer in accordance with the present invention is formed on a supporting layer (or a prime-coating layer) by vapor-depositing the ferromagnetic metals or alloys thereupon in the form of a thin layer. Usable ferromagnetic metals include cobalt, nickel or the like. The ferromagnetic alloys may be, for example, Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-La, Co-Ni-Ce, Co-Ni-Zn, Co-Ni-Cu, Co-Ni-W, Co-Ni-Re, Co-Sm-Cu, or the like. The thickness of the ferromagnetic metal layer for use in the magnetic recording medium generally ranges from $0.5\mu$ to $2\mu$, preferably from $0.1\mu$ to $0.4\mu$.

Formation of the ferromagnetic metal layer as described above by the vapor deposition process is described for example by L. Holland in "Vacuum Deposition of Thin Film" (Chapman & Hall Ltd., 1956), L. I. Maissel & R. Glang in "Handbook of Thin Film Technology" (McGraw-Hill Co., 1970), and in U.S. Pat. Nos. 2,671,034, 3,329,601, 3,342,632, 3,342,633, 3,516,860, 3,615,911, 3,625,849, 3,700,500, 3,772,174, 3,772,179, 3,787,237, and 3,856,579.

The oblique incidence deposition process is particularly preferred for the purpose of forming the magnetic metal thin film layer which contains the columnar grain structures spaced apart from each other so as to allow a polymer to intervene therebetween. In the oblique incidence deposition process, a ferromagnetic metal is vaporized and the resulting vapor stream of the ferromagnetic metal is caused to impinge upon a supporting layer at an oblique angle with respect to the surface of the supporting layer. In this way, a thin film of the ferromagnetic metal is formed on the supporting layer. The thin film of the magnetic metal formed by the oblique incidence deposition process not only has columnar grain structures spaced apart from one another but also exhibits those magnetic characteristics which are desirable for a high-density magnetic recording medium. In the oblique incidence deposition, it is preferred that the incident angle of the vapor stream of the ferromagnetic metal be 50° or more. In this case, a film having the columnar grain structures having their longitudinal axes lying at an oblique angle with respect to the surface of a substrate 2 is formed as shown in FIG. 1. Normally, the angle of the longitudinal axes of the formed clumnar grain structures with respect to a line normal to the surface of the sbustrate is smaller than the incident angle of the vapor stream during the deposition process. The volumetric ratio of the spaces between the columnar grain structures in the thin film layer 3 of magnetic metal may vary from 10% to 60% when the incident angle of the vapor stream is 50° or more with respect to the surface of the substrate. Further, the oblique incidence deposition process may be conducted in such a manner that the vapor stream is caused to impinge upon a supporting layer at a large incident angle and be deposited thereon at a low deposition rate, followed by a gradual decrease in the incident angle and a gradual increase in the deposition rate. In this case, there can be obtained a magnetic layer having the oblique claviform structures as denoted by the reference numeral 4 in the FIGURE. Such oblique calviform structures are particularly suitable to allow the thermoplastic prime-coating layer to enter the spaces between such structures in the magnetic layer under heat and pressure.

In general, the thermoplastic resin used for the prime-coating layer in the present invention should show good adhesion to the substrate film, and have a softening point of 150° C. or less, preferably from 60° to 120° C. It should also have an average molecular weight of 10,000 to 200,000 and a degree of polymerization of about 200 to 2,000. The thermoplastic resin may, for example, be vinyl chloride-vinylidene chloride copolymer, vinyl chlorideacrylonitrile copolymer, acrylic ester-acrylonitrile copolymer, acrylic ester-vinylidene chloride copolymer, acrylic ester-styrene copolymer, methacrylic ester-vinylidene chloride copolymer, urethane elastomer, vinylidene chlorideacrilonitrile copolymer, polyvinyl butyral resin, polyester resin or a mixture of one or more of these.

The thermoplastic resin as described above is dissolved in an organic solvent. The resulting solution is then applied onto the non-magnetic substrate and dried to form the prime-coating layer according to the present invention. The thickness of the prime-coating layer in the dry state should generally be about 0.03µ to 2.0µ, preferably 0.1µ to 1µ.

In the present invention, the layers of the magnetic recording medium should have an effective bonding strength in an atmosphere at temperatures ranging from $-20°$ to $+70°$ C. and a relative humidity of 80%. The layers should show a tensile bond strength of at least 100 g/cm$^2$ when pulled apart at a rate of 20 cm/minute using a TOM tensile testing machine.

If necessary, a lubricant layer may be added to the prime-coating layer according to the present invention. In this case, it is preferable that the amount of the lubricant used be 10 wt. % or less based on the prime-coating layer.

As described above, organic solvents are used when applying the prime-coating layer onto the substrate in accordance with the present invention. Examples of the organic solvents which may be used for this purpose are ketones such as methyl ethyl ketone, methyl isobutyl ketone and cyclohexanone; alcohols such as methyl alcohol, ethyl alcohol, propyl alcohol and butyl alcohol; esters such as methyl acetate, ethyl acetate, butyl acetate, ethyl lactate and glycol acetate monoethyl ether; ethers such as ethyl ether, ethylene glycol dimethyl ether, ethylene glycol monoethyl ether and dioxane; aromatic hydrocarbons such as benzene, toluene and xylene, or the like. Methyl ethyl ketone is mainly be used.

It is preferred that methyl ethyl ketone by used in admixture with one or more of the other organic solvents described above. In this case, methyl ethyl ketone is used in an amount of 50 to 100 wt.%, preferably 80 to 95 wt.%, based on the solvent mixture.

The prime-coating layer may be applied onto the non-magnetic substrate by such coating methods as, for example, air doctor coating, blade coating, air-knife coating, squeeze coating, impregnation coating, reverse-roll coating, transfer roll coating, gravure coating, kiss-roll coating, cast coating, spray coating or the like. These coating methods are described in detail, for example, in "Coating Kogaku" (Coating Engineering), pp. 253-277 (Mar. 20, 1971) published by Asakura Shoten (Japan).

After being applied to the substrate, the prime-coating layer is dried for about 2 to 10 seconds at a temperature of 100° C. or less, preferably from 70° to 100° C., especially from 80° to 90° C., in an air flow of 1 to 5 kl/m$^2$/sec. preferably 2 to 3 kl/m$^2$/sec.

The non-magnetic substrate may, for example, be a film made of a cellulose such as cellulose and cellulose acetate, polyester resin such as polyethylene terephthalate and polyethylene-2, 6-naphthalate, polyamide-imide resin, polyimide resin or the like.

After the prime-coating layer is applied to the substrate as described above, the thin film of magnetic metal is formed on the prime-coating layer, and the obtained layer combination is then pressed under heat. Calender rolls comprising at least one metal roll and at least one elastic roll are suitable for heating and pressing the layer combination. When such calender rolls are used, the layer combination obtained as described above is passed therethrough such that the surface of the magnetic layer may come into contact with the metal roll, and the non-magnetic surface with the elastic roll. The elastic roll is made of cellulose fiber or plastic materials having a Shore hardness of 75 or more, preferably 80 or more. The plastic material used for the elastic roll may be nylons, rubbers or the like. The aforesaid metal roll may be a planished roll prepared by providing a hard chrome plating layer on the surface of a metal material having no pin holes. The metal material used for the metal roll may be stainless steel, e.g., SUS-304, non-pin hole castings obtained by centrifugal casting, machine-structural steels obtained by forging, or the like. The calendering metal roll is preferably heated to a temperature not lower than the softening point of the thermoplastic prime-coating layer, viz., to a temperature of 60° C. or more. The pressure applied to the layer combination ranges from 10 to 200 kg/cm, expressed in terms of the linear pressure obtained by dividing the roll pressure by the roll length. The temperature and the pressure should be sufficiently high to allow the thermoplastic prime-coating layer to enter the spaces between the columnar grain structures in the magnetic layer, but should not be so high as to damage the columnar grain structures of the magnetic layer to a large extent. Suitable temperature and pressure conditions can be determined through simple experiments.

Before or after the heating and pressing step, a solution of a lubricant in an organic solvent may, if necessary, be applied to the surface of the magnetic recording medium of the present invention to reduce the frictional resistance. Such a solution is used at a rate of about 10 to 100 mg/m$^2$. The lubricant may be higher a fatty acid, higher alcohol, higher fatty amide, silicone oil, fluorine resin, or the like.

The present invention will further be illustrated by the following nonlimitative examples.

EXAMPLE 1

A prime-coating solution as described above was uniformly applied to a 22μ-thick polyethylene terephthalate film in such an amount that the thickness of the formed prime-coating layer would be 0.4μ in the dry state. The applied solution was then dried at a temperature of 80° C. for 7 seconds in an air flow of 2.5 kl/m²/sec. to form the prime-coating layer.

Prime-coating solution (2 wt. % density solution):
  Amorphous linear saturated polyester, a terpolymer obtained from isophthalic acid, sebacic acid and ethylene glycol and having an average molecular weight of 17,000 and an intrinsic viscosity (at 30° C., 0.5% solution in phenol/tetrachloroethane=6/4) of 0.54 ... 70 parts
  Vinylidene chloride-acrylonitrile copolymer, having a nitrogen content of 5.1% and a solution viscosity (at 25° C., 2 wt. % solution in dimethylformamide) of 2.2 centipoises ... 30 parts
  Mixed methyl ethyl ketone/cyclohexane (9:1) solution ... 5,000 parts Thereafter, a cobalt magnetic film was obliquely deposited to a thickness of 0.2μ upon the prime-coated polyethylene terephthalate film to form a magnetic tape. In this oblique deposition, an electron beam evaporation source charged with 99.95% pure cobalt was used in a vacuum of $5 \times 10^{-5}$ Torr, and the incident angle of cobalt vapor was set at 70 with respect to the surface of the prime-coated polyethylene terephthalate film.

Observation with a scanning electron microscope revealed that the deposited layer contained columnar grain structures having longitudinal axes lying at an angle of 50° with respect to a line normal to the surface of the prime-coating layer. The volumetric ratio of the spaces between the columnar grain structures was 20%. The magnetic tape thus obtained was then heated and pressed in a three-roll calender. The top metal roll of the three-roll calender was heated to 90° C., the core of the middle cotton roll (prepared by compressing cotton linter into a roll form) was water-cooled, and the lowermost metal roll was heated to 80° C. The pressure between the top and middle rolls was set at 50 kg/cm in terms of the linear pressure, and the magnetic tape was passed through the rolls at the rate of 20 m/minute. Observation of the section of the so treated magnetic tape by use of an electron microscope confirmed that the prime-coating layer penetrated into the spaces between the columnar grain structures to an extent of 60 to 80% and tightly adhered to the grain structures. The magnetic tape thus prepared was referred to as specimen No. 1. Another specimen (No. 11) was prepared in the same way as described above, except that the heating and pressing step according to the present invention was omitted.

EXAMPLE 2

Following the procedure described in Example 1 above, magnetic tapes having a 0.1μ-thick prime-coating layer (specimen No. 2) and a 2.0μ-thick prime-coating layer (specimen No. 3) were prepared. Further, specimen Nos. 4 and 5 were similarly prepared by setting the heating and pressing conditions of the top metal roll at 60° C.-100 kg/cm and 100° C.-30 kg/cm, respectively. Thereafter, the degree of penetration of the prime-coating layer into the spaces between the columnar grain structures in the magnetic layer was measured for each of specimen Nos. 1 to 5. The durability of specimen Nos. 1 to 5 and 11 was also measured. The results were as shown in Table 2. Durability was measured by passing a 0.5 inch wide magnetic tape through a VHS system video tape recorder at a speed of 3.3 cm/sec. under a tension of 90 g/0.5 inch. The magnetic tape was reciprocated 0, 10 and 50 times in the video tape recorder, and the scratches and the still frame reproducing time thereof were determined.

TABLE 2

| Specimen | Peel strength | Penetration of prime-coating layer into magnetic layer | Durability Original | | 10 reciprocations | | 50 reciprocations | |
|---|---|---|---|---|---|---|---|---|
| | | | Flaw | Still | Flaw | Still | Flaw | Still |
| No. 1 | 150 g/cm² | 70% | ⊚ | 20' | ⊚ | 18' | ⊚ | 17' |
| No. 2 | 90 g/cm² | 40% | ○ | 10' | ○ | 12' | ○ | 9' |
| No. 3 | 120 g/cm² | 65% | ○ | 25' | ○ | 20' | ○ | 22' |
| No. 4 | 110 g/cm² | 60% | ○ | 20' | ○ | 15' | ○ | 15' |
| No. 5 | 180 g/cm² | 80% | ⊚ | 30' | ⊚ | 28' | ⊚ | 32' |
| No. 11 | 60 g/cm² | 5% | ○ | 5' | × | 3' | ×× | 3' |

Peel strength: Measured by pulling apart at a rate of 20 cm/minute in a TOM tensile testing machine.
Flaw:
⊚ = No flaws.
○ = No deep flaws over the entire length. One or two shallow flaws.
× = One or two deep flaws, or many shallow flaws.
×× = Many deep flaws.

As is clear from Table 2, the thin metal film type magnetic recording medium of the present invention exhibits remarkably improved durability. In addition, the effect of this improvement lasts over long periods of time. Thus, the magnetic recording medium of the present invention is extremely useful in practical use.

What is claimed is:

1. A method of preparing a magnetic recording medium which comprises applying a thermoplastic prime-coating layer onto a substrate, forming a ferromagnetic metal layer having columnar grain structures on said prime-coating layer by means of vapor deposition, and thereafter pressing said ferromagnetic metal layer from the top thereof, whereby said prime-coating layer is at least partially integrated with said ferromagnetic metal layer.

2. A method of preparing a magnetic recording medium as defined in claim 1 wherein said vapor deposition is effected by the oblique incidence deposition process.

3. A method of preparing a magnetic recording medium as defined in claim 2 wherein the vapor stream of the ferromagnetic metal is caused to impinge upon the prime-coating layer at a large incident angle and be deposited thereon at a low deposition rate, followed by a gradual decrease in the incident angle and a gradual increase in the deposition rate.

4. A method of preparing a magnetic recording medium as defined in claim 2 wherein said oblique incidence deposition is effected at an incident angle of the vapor stream of 50° or more with respect to the surface of the substrate.

5. A method of preparing a magnetic recording medium as defined in claim 4 wherein said pressing is conducted by use of calender rolls comprising at least one metal roll and at least one elastic roll.

6. A method of preparing a magnetic recording medium as defined in claim 5 wherein the surface of the magnetic layer is brought into contact with the metal roll, and the non-magnetic surface with the elastic roll.

7. A method of preparing a magnetic recording medium as defined in claim 5 wherein said metal roll is heated to a temperature not less than the softening point of the thermoplastic prime-coating layer.

8. A method of preparing a magnetic recording medium as defined in claim 5 wherein a linear pressure ranging from 10 to 200 kg/cm is applied between the metal and elastic rolls.

9. A method of preparing a magnetic recording medium as defined in claim 5 wherein said elastic roll has a Shore hardness of 75 or more.

10. A method of preparing a magnetic recording medium as defined in claim 1 wherein said prime-coating layer is made of a thermoplastic resin having a softening point of 150° C. or less, an average molecular weight of 10,000 to 200,000, and a degree of polymerization of about 200 to 2,000.

11. A method of preparing a magnetic recording medium as defined in claim 1 wherein said prime-coating layer has a thickness of about 0.03 to $2.0\mu$ in the dry state.

12. A method of preparing a magnetic recording medium as defined in claim 1 wherein said prime-coating layer contains a lubricant in the amount of 10 wt. % or less based on the prime-coating layer.

13. A method of preparing a magnetic recording medium as defined in claim 1 wherein said ferromagnetic metal layer has a thickness of 0.05 to $2\mu$.

* * * * *